(No Model.)
P. A. PETERSON.
COFFEE ROASTER.
No. 305,959. Patented Sept. 30, 1884.
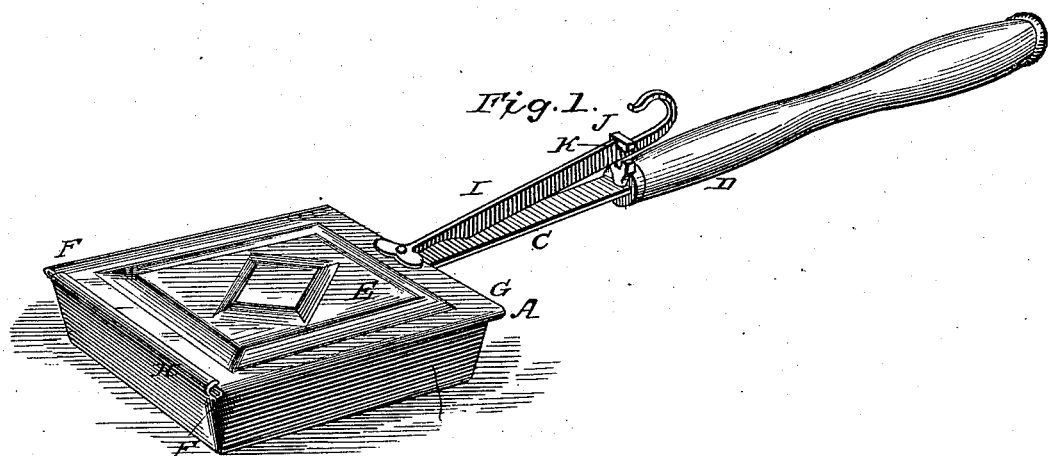
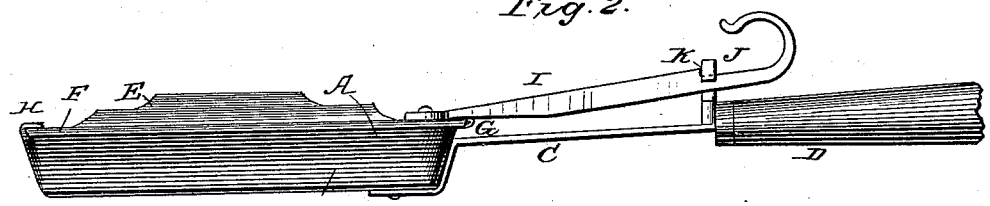
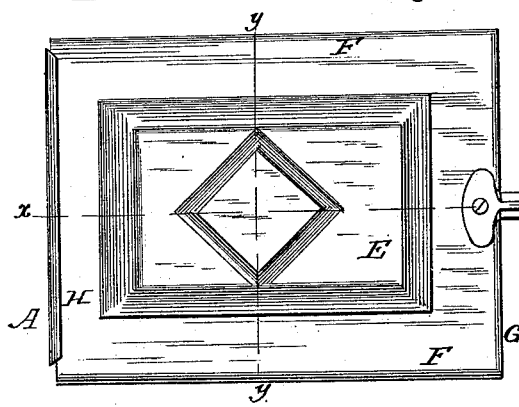
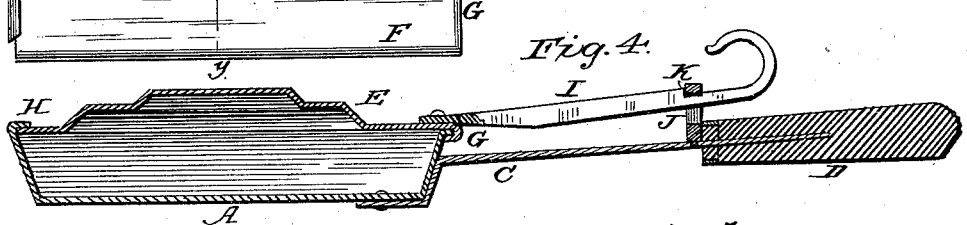
WITNESSES:
Fred. G. Dieterich
Wth Lecher
INVENTOR.
Peter A. Peterson.
By Louis Bagger & Co
ATTORNEYS.

UNITED STATES PATENT OFFICE.

PETER A. PETERSON, OF HANDSOMS DEPOT, VIRGINIA.

COFFEE-ROASTER.

SPECIFICATION forming part of Letters Patent No. 305,959, dated September 30, 1884.

Application filed October 31, 1883. (No model.)

*To all whom it may concern:*

Be it known that I, PETER A. PETERSON, of Handsoms Depot, in the county of Southampton and State of Virginia, have invented certain new and useful Improvements in Coffee-Roasters; and I do hereby declare that the following is a full, clear, and exact description of the invention, which will enable others skilled in the art to which it appertains to make and use the same, reference being had to the accompanying drawings, which form a part of this specification, and in which—

Figure 1 is a perspective view of my improved coffee-roaster. Fig. 2 is a side view of the same. Fig. 3 is a top view, and Figs. 4 and 5 are vertical sections on lines $x\ x$ and $y\ y$, Fig. 3.

Similar letters of reference indicate corresponding parts in all the figures.

My invention has relation to coffee-roasters; and it consists in the improved construction and combination of parts of the same, as hereinafter more fully described and claimed.

In the accompanying drawings, the letter A indicates a rectangular pan having outwardly-sloping sides forming flanges B at their upper edges, and secured upon the outer end of a shank, C, of spring metal, inserted into a handle, D, of wood or similar material. A cover, E, slides with the inwardly-bent edges or flanges F of its sides upon the flanges of the pan, and has an inwardly-bent rear edge or flange, G, which fits over the outwardly-bent rear flange of the pan, while the front edge of the cover fits in under the inwardly-bent front edge or flange, H, of the pan. A bar, I, is secured to the rear edge of the cover, projecting rearwardly and slightly upwardly, and has a shoulder, K, upon its upper edge, near its rear end, and a hook or handle, by means of which the bar and the cover with it may be manipulated. This shoulder is adapted to bear against the forward side of the upper end of a bail, J, projecting upward from the shank of the pan near the handle when the cover is closed over the pan, the bar of the cover sliding in the said bail. The springiness of the shank of the pan will serve to draw the bail down behind the shoulder of the bar I, and thus hold the bar and cover in place, keep the flanges of the cover and of the pan in close contact, and prevent the flavor of the coffee from escaping when the pan is placed over the fire.

Having thus described my invention, I claim and desire to secure by Letters Patent of the United States—

The herein-described coffee-roaster, consisting of the rectangular pan having its side and rear edges bent outward and its front edge bent inward, the spring-shank secured in the handle and having the pan secured to its outer end, the lid or cover having inwardly-bent side and rear edges, the flat bar secured to the rear edge of the cover and forming a shoulder at its upper edge near its rear hooked end, and the upright bail straddling the shouldered flat bar and secured upon the spring-shank, all constructed and combined as and for the purpose shown and set forth.

In testimony that I claim the foregoing as my own I have hereunto affixed my signature in presence of two witnesses.

PETER A. PETERSON.

Witnesses:
WM. SECHER,
JNO. W. BEATON.